(12) United States Patent
Swarbrick

(10) Patent No.: US 11,281,810 B1
(45) Date of Patent: Mar. 22, 2022

(54) MEMORY ACCESS PROTECTION IN PROGRAMMABLE LOGIC DEVICE

(71) Applicant: Xilinx, Inc., San Jose, CA (US)

(72) Inventor: Ian A. Swarbrick, Santa Clara, CA (US)

(73) Assignee: XILINX, INC., San Jose, CA (US)

( * ) Notice: Subject to any disclaimer, the term of this patent is extended or adjusted under 35 U.S.C. 154(b) by 634 days.

(21) Appl. No.: 16/216,986

(22) Filed: Dec. 11, 2018

(51) Int. Cl.
*G06F 21/76* (2013.01)
*G06F 21/78* (2013.01)
*H03K 19/17768* (2020.01)
*G06F 12/14* (2006.01)

(52) U.S. Cl.
CPC .......... *G06F 21/76* (2013.01); *G06F 12/1441* (2013.01); *G06F 21/78* (2013.01); *H03K 19/17768* (2013.01); *G06F 2212/1052* (2013.01)

(58) Field of Classification Search
CPC ...... G06F 21/76; G06F 12/1441; G06F 21/78; H03K 19/17768
See application file for complete search history.

(56) References Cited

U.S. PATENT DOCUMENTS

| | | | |
|---|---|---|---|
| 9,047,474 B1 | 6/2015 | Ahmad et al. | |
| 9,130,559 B1 | 9/2015 | Ahmad et al. | |
| 9,213,866 B1* | 12/2015 | Ahmad | G06F 21/76 |
| 9,720,868 B2 | 8/2017 | Arbel et al. | |
| 9,781,120 B2* | 10/2017 | Rohleder | G06F 21/60 |
| 2005/0114616 A1* | 5/2005 | Tune | G06F 12/1441 |
| | | | 711/163 |
| 2011/0067114 A1* | 3/2011 | Weber | G06F 21/78 |
| | | | 726/28 |
| 2012/0023270 A1* | 1/2012 | Nadehara | G06F 9/468 |
| | | | 710/22 |
| 2012/0036509 A1* | 2/2012 | Srinivasan | G06F 9/526 |
| | | | 718/102 |
| 2016/0004647 A1* | 1/2016 | Eppensteiner | G06F 12/14 |
| | | | 710/110 |

(Continued)

OTHER PUBLICATIONS

Benjamin Tan et al, Towards decentralized system-level security for MPSoC-based embedded applications, Elsevier B.V. (Year: 2017).*

*Primary Examiner* — Shanto Abedin
(74) *Attorney, Agent, or Firm* — Patterson + Sheridan, LLP

(57) ABSTRACT

Examples described herein provide for memory access protection in programmable logic devices. In an example, an integrated circuit includes a programmable logic region, control logic, an interconnect, and a memory controller. The control logic is communicatively coupled to the programmable logic region. The control logic is configurable to generate one or more transaction attributes of a memory transaction request, and the memory transaction request is communicated from the programmable logic region. The interconnect is communicatively coupled to the control logic. The interconnect is operable to communicate the memory transaction request therethrough. The memory controller is communicatively coupled to the interconnect. The memory controller is operable to receive the memory transaction request. The memory controller is configurable to determine whether the memory transaction request is permitted based on the one or more transaction attributes.

20 Claims, 7 Drawing Sheets

(56) References Cited

U.S. PATENT DOCUMENTS

| | | | | |
|---|---|---|---|---|
| 2016/0156632 A1* | 6/2016 | Rohleder | ................ | G06F 21/70 |
| | | | | 726/27 |
| 2016/0179721 A1* | 6/2016 | Neiger | .................... | G06F 13/34 |
| | | | | 710/264 |
| 2016/0364343 A1* | 12/2016 | Case | ..................... | H04L 9/0637 |
| 2016/0371221 A1* | 12/2016 | Rosenberg | .......... | G06F 13/4282 |
| 2017/0185345 A1* | 6/2017 | Lim | ...................... | G06F 3/0637 |
| 2019/0103872 A1* | 4/2019 | Clark | .............. | H03K 19/17708 |
| 2019/0386966 A1* | 12/2019 | Ostrikov | ............. | H04L 63/0435 |

* cited by examiner

| Memory Aperture | Memory Range | Master Identification | Protection Indication | Permitted Access |
|---|---|---|---|---|
| A | | 0 to 134 | Non-secure | Read and Write |
| B | | All | Non-secure | Read Only |
| C | | 135 | Secure | Read and Write |
| D | | All | Non-secure | None |

FIG. 6

MEMORY ACCESS PROTECTION IN PROGRAMMABLE LOGIC DEVICE

TECHNICAL FIELD

Examples of the present disclosure generally relate to programmable logic devices and, in particular, to memory access protection in programmable logic devices.

BACKGROUND

In computing systems, memory protection is a concern for multiprocessing within a system. Particularly, security of memory resources implemented in multiprocessing is usually a concern. A process that is running in the system should not be able to access memory resources allocated for another process, and vice versa. This protection measure can prevent, for example, a bug or malware from being written to memory of one process by another process. Such a bug or malware can lead to vulnerability of the process of the memory to which the bug or malware was written. Further, isolation of resources can prevent unintended or accidental access by one process to resources allocated for another process. A number of memory protection and security schemes may be available for any system.

SUMMARY

Examples described herein provide for memory access protection in programmable logic devices. In some examples, control logic (e.g., hardened control logic) disposed between a programmable logic region and memory or a memory mapped resource provides attributes of a memory transaction request from the programmable logic region (e.g., from a master circuit operating on the programmable logic region). The attributes may be used to facilitate memory access protection in a programmable logic device.

An example of the present disclosure is an integrated circuit. The integrated circuit includes a programmable logic region, control logic, an interconnect, and a memory controller. The control logic is communicatively coupled to the programmable logic region. The control logic is configurable to generate one or more transaction attributes of a memory transaction request, and the memory transaction request is communicated from the programmable logic region. The interconnect is communicatively coupled to the control logic. The interconnect is operable to communicate the memory transaction request therethrough. The memory controller is communicatively coupled to the interconnect. The memory controller is operable to receive the memory transaction request. The memory controller is configurable to determine whether the memory transaction request is permitted based on the one or more transaction attributes.

Another example of the present disclosure is a method for operating an integrated circuit. A memory transaction request is transmitted from a master circuit operating on a programmable logic region to control logic. One or more transaction attributes of the memory transaction request is generated by the control logic. The memory transaction request containing the one or more transaction attributes is transmitted from the control logic to a memory controller. Whether the memory transaction request is permitted based on the one or more transaction attributes is determined by the memory controller. Access to a memory resource, via the memory controller, is provided according to the memory transaction request when the memory transaction request is permitted.

Another example of the present disclosure is an integrated circuit. The integrated circuit includes a programmable logic region, a network-on-chip (NoC), and a memory controller. The NoC includes a NoC master unit (NMU) and a NoC slave unit (NSU). The NMU is an interface to the NoC for the programmable logic region. The NMU comprises control logic configurable to provide one or more transaction attributes of a memory transaction request from the programmable logic region. The memory controller is communicatively coupled to the programmable logic region via the NoC. The memory controller comprises a memory protection unit (MPU). The NSU is an interface to the NoC for the memory controller. The MPU is configurable to permit access to a memory resource according to the memory transaction request when the one or more transaction attributes match one or more aperture attributes of at least one of one or more memory apertures.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 6 is an example configuration of a look-up table (LUT) for a memory protection unit (MPU) according to some examples.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
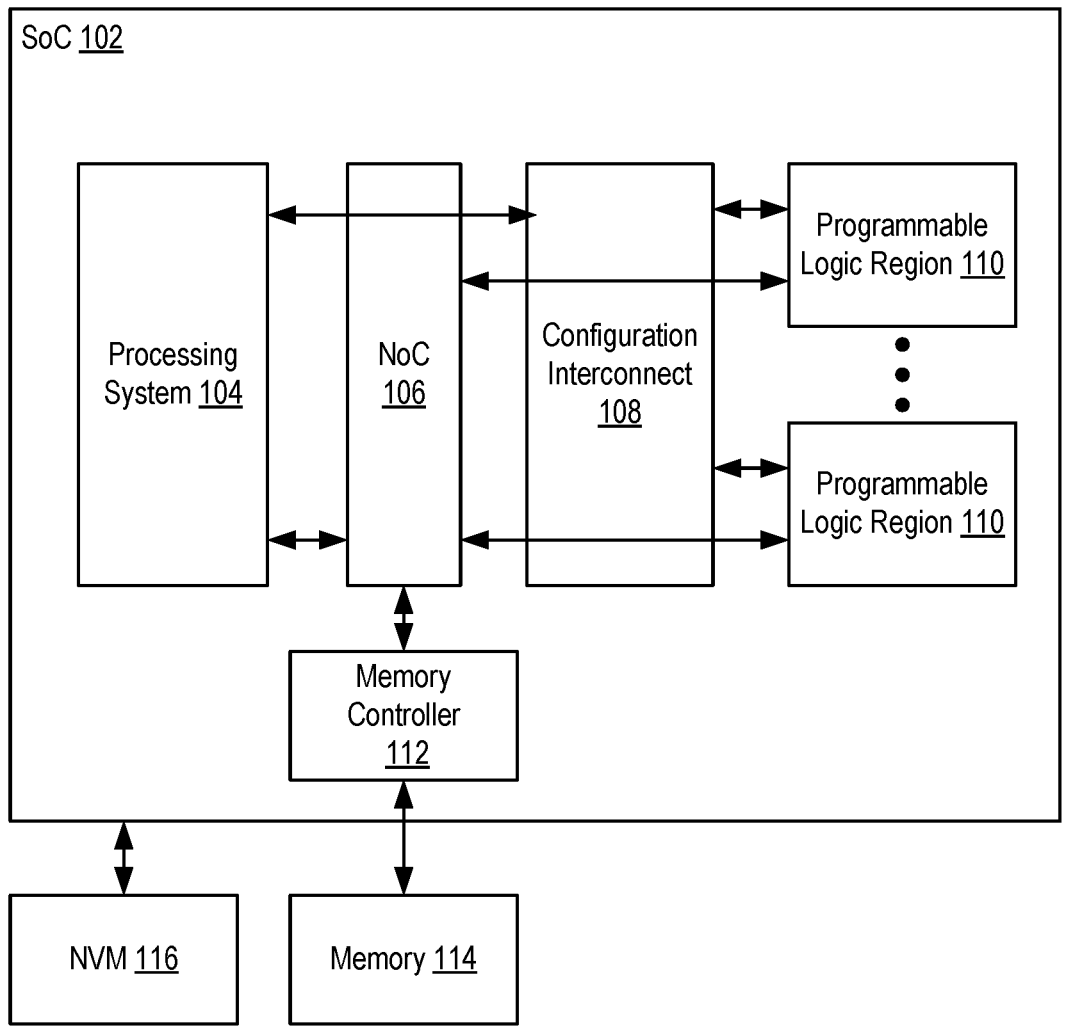
FIG. 1 is a block diagram depicting a system-on-chip (SoC) that includes programmable logic regions according to some examples.

Examples described herein provide for memory access protection in programmable logic devices. In some examples, control logic (e.g., hardened control logic) disposed between a programmable logic region and memory or a memory mapped resource provides attributes of a memory transaction request from the programmable logic region (e.g., from a master circuit operating on the programmable logic region). The attributes of the memory transaction request can be compared by a memory protection unit (MPU) in a memory controller to attributes of predefined memory apertures to determine whether access to the memory or memory mapped resource by the memory transaction request is permitted. The attributes provided by the control logic can therefore be implemented to facilitate memory access protection in a programmable logic device.

Programmable logic devices, such as field programmable gate arrays (FPGAs), can be implemented to provide, e.g., acceleration resources to third parties. For example, FPGA-as-a-service can be implemented in data centers where an owner of the FPGA device can control a system-level configuration of the FPGA device and can provide FPGA resources as a service to third parties. The third parties can load or instantiate applications into one or more programmable logic regions in the FPGA device. The applications can use memory or memory mapped resources within the FPGA device. Any given third party likely will not be aware of other applications operating on programmable logic regions of the FPGA device. Hence, any third party may not be able to provide a unique identification to any master circuit in that third party's application that may request access to memory or memory mapped resources. Additionally, any given third party may attempt to use privileges, such as security privileges, that are beyond the scope of what the owner has agreed to provide.

Some examples provided herein provide for control logic (e.g., hardened control logic) that can generate unique identifications for master circuits of different applications operating in one or more programmable logic regions. Additionally, in some examples, the control logic can generate a protection indication for memory transaction requests from such master circuits. Other attributes may be generated by the control logic for any memory transaction request from master circuits operating the in the one or more programmable logic regions. The attributes, including the unique identification of the master circuit and a protection indication, of the memory transaction request can be compared by a MPU in a memory controller to attributes of predefined memory apertures, e.g., configured in a look-up table (LUT), to determine whether the memory transaction request is permitted to access memory. The control logic and MPU can be configured during a system-level configuration, e.g., by the owner of the programmable logic device, to ensure proper isolation and security of memory and memory mapped resources between applications implemented on programmable logic regions by third parties.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a system-on-chip (SoC) 102 according to some examples. The SoC 102 is an integrated circuit (IC) that is a programmable logic device (e.g., a programmable SoC). The SoC 102 comprises a processing system 104, a network-on-chip (NoC) 106, a configuration interconnect 108, one or more programmable logic regions 110, and a memory controller 112. The SoC 102 is communicatively coupled to memory 114 via the memory controller 112. The memory 114, as illustrated, is off-chip from the SoC 102, while in other examples, the memory 114 can be in the SoC 102. The memory 114 can be any memory, such as static random access memory (SRAM), dynamic random access memory (DRAM) like double data rate synchronous DRAM (DDR SDRAM), or other memory. The SoC 102 can also be coupled to external circuits, such as a nonvolatile memory (NVM) 116. The NVM 116 can store data that can be loaded to the SoC 102 for configuring the SoC 102, such as configuring the NoC 106 and the programmable logic region(s) 110. In general, the processing system 104 is connected to the programmable logic region(s) 110 through the NoC 106 and through the configuration interconnect 108. The programmable logic region(s) 110 are also connected to the memory controller 112 (e.g., to access the memory 114) through the NoC 106.

The processing system 104 can include one or more processor cores. For example, the processing system 104 can include a number of ARM-based embedded processor cores. The programmable logic region(s) 110 can include any number of configurable logic blocks (CLBs), which may be programmed or configured using the processing system 104 through the configuration interconnect 108. For example, the configuration interconnect 108 can enable, for example, frame-based programming of the fabric of the programmable logic region(s) 110 by a processor core of the processing system 104 (such as a platform management controller (PMC)).

Figure 2:
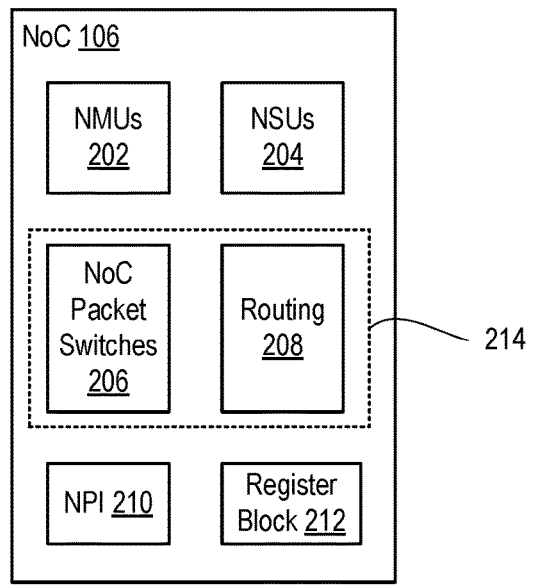
FIG. 2 is a block diagram depicting a network-on-chip (NoC) according to some examples.

FIG. 2 is a block diagram depicting the NoC 106 according to some examples. The NoC 106 includes NoC master units (NMUs) 202, NoC slave units (NSUs) 204, a network 214, NoC peripheral interconnect (NPI) 210, and register blocks 212. Each NMU 202 is an ingress circuit that connects a master circuit to the NoC 106. Each NSU 204 is an egress circuit that connects the NoC 106 to a slave endpoint circuit. The NMUs 202 are connected to the NSUs 204 through the network 214. In an example, the network 214 includes NoC packet switches 206 and routing 208 between the NoC packet switches 206. Each NoC packet switch 206 performs switching of NoC packets. The NoC packet switches 206 are connected to each other and to the NMUs 202 and NSUs 204 through the routing 208 to implement a plurality of physical channels. The NoC packet switches 206 also support multiple virtual channels per physical channel. The NPI 210 includes circuitry to program the NMUs 202, NSUs 204, and NoC packet switches 206. For example, the NMUs 202, NSUs 204, and NoC packet switches 206 can include register blocks 212 that determine functionality thereof.

The NPI 210 includes a peripheral interconnect coupled to the register blocks 212 for programming thereof to set functionality. The register blocks 212 in the NoC 106 support interrupts, quality of service (QoS), error handling and reporting, transaction control, power management, and address mapping control. The register blocks 212 can be initialized in a usable state before being reprogrammed, such as by writing to the register blocks 212 using write requests. Configuration data for the NoC 106 can be stored in the NVM 116 and provided to the NPI 210 for programming the NoC 106 and/or other slave endpoint circuits.

Figure 3:
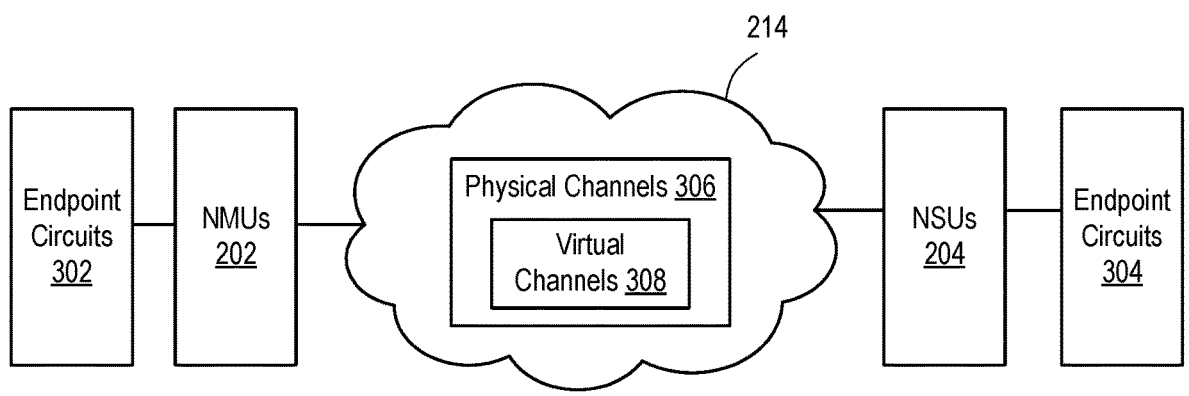
FIG. 3 is a block diagram depicting connections between endpoint circuits through the NoC according to some examples.

FIG. 3 is a block diagram depicting connections between endpoint circuits through the NoC 106 according to some examples. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104, a circuit in a programmable logic region 110, or a circuit in another subsystem. Each endpoint circuit in the programmable logic region 110 can be a dedicated circuit (e.g., a hardened circuit) or a circuit configured in a programmable logic region 110.

The network 214 includes a plurality of physical channels 306. The physical channels 306 are implemented by programming the NoC 106. Each physical channel 306 includes one or more NoC packet switches 206 and associated routing 208. An NMU 202 connects with an NSU 204 through at least one physical channel 306. A physical channel 306 can also have one or more virtual channels 308.

Figure 4:
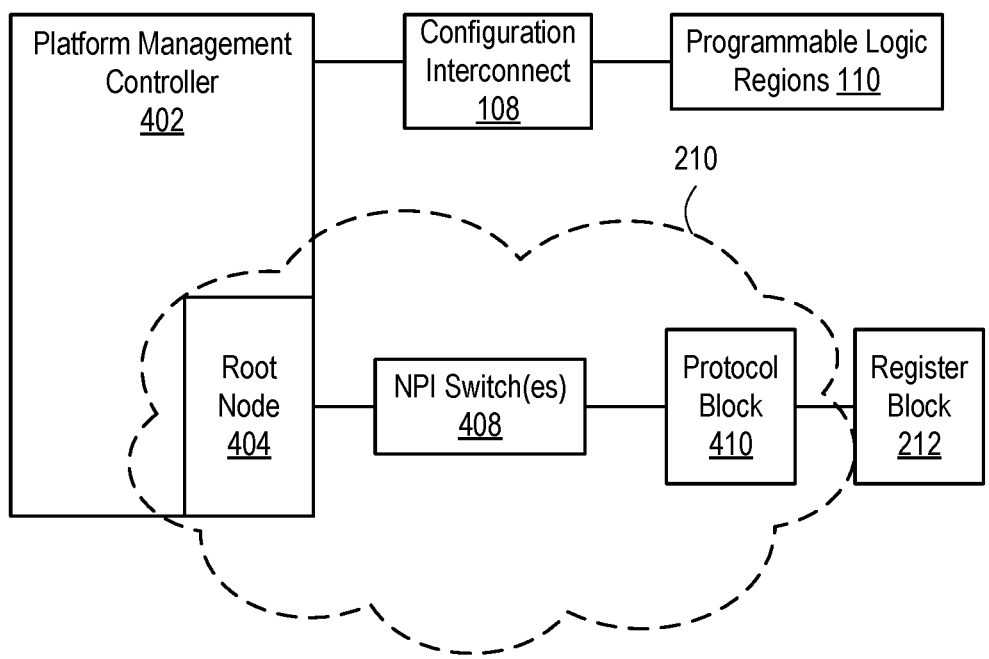
FIG. 4 is a block diagram depicting connections to a register block through a NoC Peripheral Interconnect (NPI) according to some examples.

FIG. 4 is a block diagram depicting connections to a register block 212 through the NPI 210 according to some examples. To connect to a register block 212, the NPI 210 includes a root node 404, one or more NPI switches 408, and a protocol block 410. The root node 404, in some examples, resides on a platform management controller (PMC) 402, which may further reside in the processing system 104, although in other examples, the root node 404 can be an independent circuit or reside on another system or circuit. The PMC 402 may be in a secure domain separate from other systems, for example. Generally, the root node 404 can packetize a transaction request into a format implemented by the NPI 210 and can transmit a memory mapped transaction request to an NPI switch 408, which can further transmit the memory mapped transaction request to other NPI switches 408 or to a protocol block 410. The protocol block 410 can then translate the memory mapped transaction request into a format implemented by the register block 212. The register block 212 is illustrated in FIG. 4 as an example of a slave endpoint circuit to which the NPI 210 can be connected. The NPI 210 can further be connected to other slave endpoint circuits, such as programmable components of a memory controller, temperature sensor, clock generator, etc. The NPI 210 can be a tree topology.

The PMC 402 is further connected to the configuration interconnect 108, which is in turn connected to the programmable logic regions 110. The PMC 402 is configured to program the fabric of the programmable logic regions 110 through the configuration interconnect 108. The configuration interconnect 108 is a delivery mechanism for programming programmable units on the SoC 102 that is independent of the delivery mechanism of the NPI 210 for programming other programmable units (e.g., slave endpoint circuits) on the SoC 102.

Figure 5:
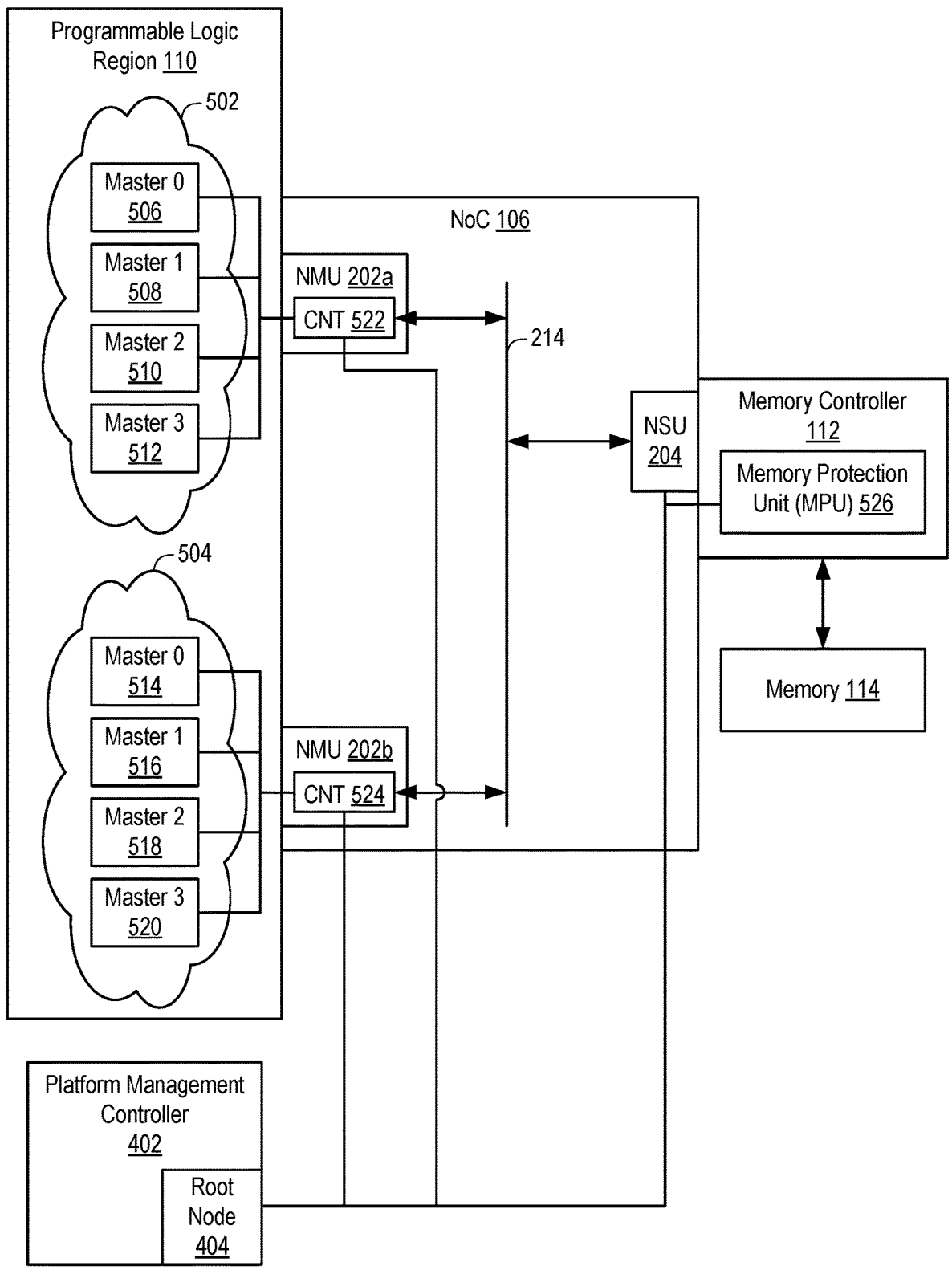
FIG. 5 is a block diagram of a memory protection architecture in a programmable logic device according to some examples.

FIG. 5 illustrates a block diagram of a memory protection architecture in a programmable logic device according to some examples. One or more programmable logic regions 110 have a first application 502 and a second application 504 instantiated and operating thereon. The first application 502 has a master circuit 0 506, a master circuit 1 508, a master circuit 2 510, and a master circuit 3 512, and the second application 504 has a master circuit 0 514, a master circuit 1 516, a master circuit 2 518, and a master circuit 3 520. Each master circuit 506, 508, 510, 512, 514, 516, 518, 520 can each implement a kernel, function, or subset or whole of the respective application 502, 504. The first application 502 and the second application 504 can be implemented by one or more configurations via the configuration interconnect 108. For example, the first application 502 and the second application 504 can be implemented as part of an original configuration of the programmable logic regions 110 and/or as part of a partial reconfiguration of the programmable logic regions 110.

The master circuits 0-3 506, 508, 510, 512 of the first application 502 on the programmable logic region 110 are communicatively coupled to a first NMU 202a of the NoC 106, and hence, the master circuits 0-3 506, 508, 510, 512 have the first NMU 202a as an interface (e.g., an ingress circuit) to the NoC 106. The master circuits 0-3 514, 516, 518, 520 of the second application 504 on the programmable logic region 110 are communicatively coupled to a second NMU 202b of the NoC 106, and hence, the master circuits 0-3 514, 516, 518, 520 have the second NMU 202b as an interface (e.g., an ingress circuit) to the NoC 106. The first NMU 202a and second NMU 202b are communicatively coupled to an NSU 204 via network 214 of the NoC 106. The NSU 204 is communicatively coupled to the memory controller 112 and acts as an interface (e.g., an egress circuit) to the NoC 106 for the memory controller 112.

The first NMU 202a includes control logic 522, and the second NMU 202b includes control logic 524. The control logic 522, 524, in some examples, are each hardened logic that is configurable, e.g., via the NPI 210. As illustrated, the control logic 522, 524 are communicatively coupled to the root node 404 of the PMC 402 via the NPI 210 (not specifically identified) for the PMC 402 to configure the control logic 522, 524. As detailed below, the control logic 522, 524 may manipulate memory transaction requests to memory 114 from any of the master circuits 506-520 based on a configuration of the control logic 522, 524.

The memory controller 112 includes a memory protection unit (MPU) 526. As illustrated, the MPU 526 is communicatively coupled to the root node 404 of the PMC 402 via the NPI 210 (not specifically identified) for the PMC 402 to configure the MPU 526. The MPU 526 is configured to compare memory transaction requests to memory 114 from the master circuits 506-520, and as manipulated by the control logic 522, 524, to permissions and attributes programmed in the MPU 526 to provide memory isolation and security. Also, as illustrated, the NSU 204 is communicatively coupled to the root node 404 of the PMC 402 via the NPI 210 (not specifically identified).

Any master circuit 506-520 is capable of transmitting a memory transaction request to the memory controller 112 to access the memory 114 or any other memory mapped resource. The memory transaction request, as generated by the master circuit, can be an Advanced eXtensible Interface (AXI) memory transaction request in some examples. The memory transaction request, as generated by the master circuit, can include various attributes. For example, the memory transaction request can include a memory address to be accessed, an indication of an access type (e.g., read or write), an application-level identification of the master circuit, and a protection indication whether the memory transaction request is secure or non-secure (e.g., the non-secure (NS) bit in the AxPROT field of an AXI transaction request). In some examples, the application-level identification may be a unique identifier within the application in which the master circuit resides. An application-level identification may not be able to differentiate between different applications, and master circuits residing in other applications may have a same or conflicting application-level identification.

In some examples, the NMU 202a, 202b reformats the memory transaction request. For example, if the memory transaction request generated by a master circuit is an AXI memory transaction request, the NMU 202a, 202b can reformat the memory transaction request to a NoC protocol packet (NPP).

Regardless of whether the memory transaction request is reformatted, the control logic 522, 524 are configurable to generate one or more attributes of a memory transaction request received from a master circuit. In some examples, the control logic 522, 524 are configured to mask or append bits to the application-level identification in the memory transaction request to generate a system-level identification unique to each master circuit. For example, if the application-level identification generated by the master circuit is y-bits and the system-level identification output by the NMU 202a, 202b is x bits, the control logic 522, 524 can generate the system-level identification by masking or appending bits (x-1) through y to the y-bits of the application-level identification generated by the master circuit. In some examples, the system-level identification output by the control logic 522, 524 takes the form as shown below:

| System-Level Identification | |
|---|---|
| From Control Logic | From Master Circuit |
| Bit<(x-1):y> | Bit<(y-1):0> | where bits (y-1) to 0 are obtained from the application-level identification provided by the master circuit, and bits (x-1) to y are generated by the masking or appending by the control logic 522, 524. Other examples can generate system-level identifications in other ways. For example, the control logic 522, 524 can generate the system-level identification by masking or appending different and/or any bits to the application-level identification.

As an example, master circuit 0 506, 514 in the first application 502 and the second application 504, respectively, can each generate a memory transaction request with an application-level identification of 0xb00 (e.g., where y is two bits). The first application 502 and the second application 504 each may not be configured in view of the other application, and hence, the conflicting application-level identifications can be generated. The PMC 402, in directing the configuration of the first application 502 and the second application 504, may have an awareness of each of the first application 502 and the second application 504. Accordingly, the PMC 402 configures the NMUs 202a, 202b to mask or append bits to the application-level identifications of the master circuits of the first application 502 and the second application 504 to provide system-level identifications of each master circuit.

Assume that a memory transaction request output from the NMU 202a, 202b has an eight bit system-level identification (e.g., x is eight bits). Assume further that the control logic 522 is configured to mask the upper six bits of the application-level identification with 0xb100000 or append 0xb100000 to the application-level identification to generate the system-level identification, and the control logic 524 is configured to mask the upper six bits of the application-level identification with 0xb100001 or append 0xb100001 to the application-level identification to generate the system-level identification. Under such circumstances, the control logic 522 generates a unique system-level identification 0xb10000000 for memory transaction requests from master circuit 0 506, and the control logic 524 generates a unique system-level identification 0xb10000100 for memory transaction requests from master circuit 0 514.

To further the example, if master circuits 1 508, 516 can each generate a memory transaction request with an application-level identification of 0xb01, master circuits 2 510, 518 can each generate a memory transaction request with an application-level identification of 0xb10, and master circuits 3 512, 520 can each generate a memory transaction request with an application-level identification of 0xb11, then the control logic 522 generates unique system-level identifications 0xb10000001, 0xb10000010, and 0xb10000011 for memory transaction requests from master circuits 1-3 508-512, respectively, and the control logic 524 generates unique system-level identifications 0xb10000101, 0xb10000110, and 0xb10000111 for memory transaction requests from master circuits 1-3 516-520, respectively. In such an example, the control logic 522 can generate unique system-level identifications in a range from 128 (decimal) to 131, and the control logic 524 can generate unique system-level identifications in a range from 132 to 135.

The NMUs 202a, 202b can be configured by the PMC 402 via the NPI 210 to set the values to be masked or appended by the control logic 522, 524. The NMUs 202a, 202b can further be configured to selectively enable the control logic 522, 524. For example, one or more registers (or bits therein) in a register block 212 of the NMUs 202a, 202b can correspond to an enable signal that can selectively enable the control logic 522, 524 and to set values to be masked or appended to application-level identifications from master circuits. The NMUs 202a, 202b can be configured at boot time, at any instance when a partial reconfiguration (e.g., of the first application 502 or second application 504) occurs, and/or at any other appropriate time.

The control logic 522, 524 are further configurable to generate another one or more attributes of a memory transaction request received from a master circuit. In some examples, the control logic 522, 524 are further configured to selectively set a protection indication in the memory transaction request that is transmitted from the NMU 202a, 202b. As stated previously, the memory transaction request, as generated by the master circuit, can include a protection indication whether the memory transaction request is secure or non-secure. The control logic 522, 524 can pass the protection indication as generated by the master circuit or can drive the protection indication to a target level. For example, the master circuits of the first application 502 may generate memory transaction requests with respective protection indications that may indicate that the memory transaction requests are secure or non-secure, and the control logic 522 can drive the protection indication to indicate that each memory transaction request from master circuits of the first application 502 are non-secure. An AND gate, a NOR gate, or other logic can be implemented to allow protection indications to pass or to be driven to a target indication.

The NMU 202a, 202b transmits the memory transaction request, which may be reformatted from the memory transaction request generated by the master circuit, through the network 214 of the NoC 106 to the NSU 204. The memory transaction request, as transmitted from the NMU 202a, 202b, can include the attributes generated by the control logic 522, 524 and any other attributes of the memory transaction request generated by the master circuit. For example, the memory transaction request can include the memory address to be accessed, the indication of the access type, the system-level identification generated by the control logic 522, 524, and the protection indication generated by the control logic 522, 524. The NSU 204 can format the memory transaction request to an original or other format and communicate the memory transaction request to the memory controller 112.

The MPU 526 is configured to compare one or more attributes of a received memory transaction request with one or more attributes of corresponding memory apertures that are predefined in the MPU 526 to determine whether the memory transaction request is permitted. The MPU 526 can be configured to compare, among other attributes, the system-level identification and/or the protection indication in the received memory transaction request with attributes of the memory apertures to determine whether the memory transaction request is permitted. The MPU 526 can include a look-up table (LUT) or other memory that is programmed with various attributes that are defined to permit access to memory. For example, a LUT can define one or more memory apertures, where each memory aperture has attributes including an address range of the memory 114, permitted system-level identifications, permitted protection indications, and permitted transactions (e.g., read and/or write). In other examples, the LUT can define attributes that are excluded from being permitted access to memory 114 in addition to, as an alternative to, and/or in combination with attributes that are permitted access to memory 114. Memory address ranges of different memory apertures may overlap, and memory apertures may be assigned priority if a memory transaction request attempts to access memory allocated to multiple memory apertures.

FIG. 6 illustrates an example configuration of a LUT for a MPU according to some examples. The LUT of FIG. 6 defines memory apertures A, B, C, D having respective designated memory ranges in memory ("Memory Range"). The memory apertures A, B, C, D can have an implicit priority based on the order of their designations. For example, memory aperture A can have a higher priority than memory aperture B, which can have a higher priority than memory aperture C, etc. Each memory aperture A, B, C, D has corresponding permitted system-level identifications of master circuits ("Master Identification"), a permitted protection indication ("Protection Indication"), and permitted access (e.g., read and/or write) ("Permitted Access"). Continuing the example from above where master circuits 506-520 have corresponding system-level identifications 128 through 135, respectively, any of the master circuits 506-518 is permitted to read and write non-secured (and possibly, secured) transactions to the memory range of memory aperture A; any of the master circuits 506-520 is permitted to read non-secured (and possibly, secured) transactions from the memory range of memory aperture B; master circuit 3 520 is permitted to read and write secured transactions to the memory range of memory aperture C; and, e.g., as a default, no access is permitted by any of the master circuits 506-520 to the memory range of memory aperture D.

When a memory transaction request is received by the MPU 526, any one or more attributes of the memory transaction request are compared to one or more attributes of memory apertures A, B, C, D in descending priority to determine whether the one or more attributes of the memory transaction request match with a memory aperture A, B, C, D. If no match is determined, the MPU 526 can generate an error message that is returned to the sending master circuit. If a match is determined, the memory transaction request is permitted, and the memory controller 112 accesses the memory 114 according to the memory transaction request.

As an example, master circuit 3 520 generates a non-secured read transaction to a memory address within the memory range of memory aperture A, and the control logic 524 is configured to pass the protection indication and generate the system-level identification as described above. Therefore, the memory controller 112 receives a read transaction with a memory address within the memory range of memory aperture A that has a system-level identification of 135 and a protection indication of non-secure. The MPU 526 first compares the received memory transaction request to memory aperture A. The memory transaction request is not permitted according to the definition of memory aperture A because the system-level identification (135) is outside of the permitted range of system-level identifications of memory aperture A. The MPU 526 then compares the received memory transaction request to memory aperture B. The memory range of memory aperture B overlaps and includes the memory range of memory aperture A. The MPU 526 determines that the memory transaction request is permitted according to the definition of memory aperture B because all master circuits are permitted to read in non-secured transactions in the memory range of memory aperture B (which includes the memory range of memory aperture A). In the illustrated example of FIG. 6, the default memory aperture D can return a message to a sending master circuit when a match is determined with memory aperture D to communicate that the memory transaction request is not permitted, such as by an error message or a response to the memory transaction request containing null data.

Various aspects have been described in the context of the provided examples. Other examples can be implemented in other contexts, such as without a NoC. For example, any interconnect may be implemented between a programmable logic region and a memory controller to transmit a memory transaction request therebetween. Further, attributes have been described as being defined for permitted memory accesses, while other examples can implement attributes that are defined for prohibited memory accesses. Even further, memory access has been described with respect to memory, while examples may be implemented in the context of any memory and/or memory mapped resource.

Figure 7:
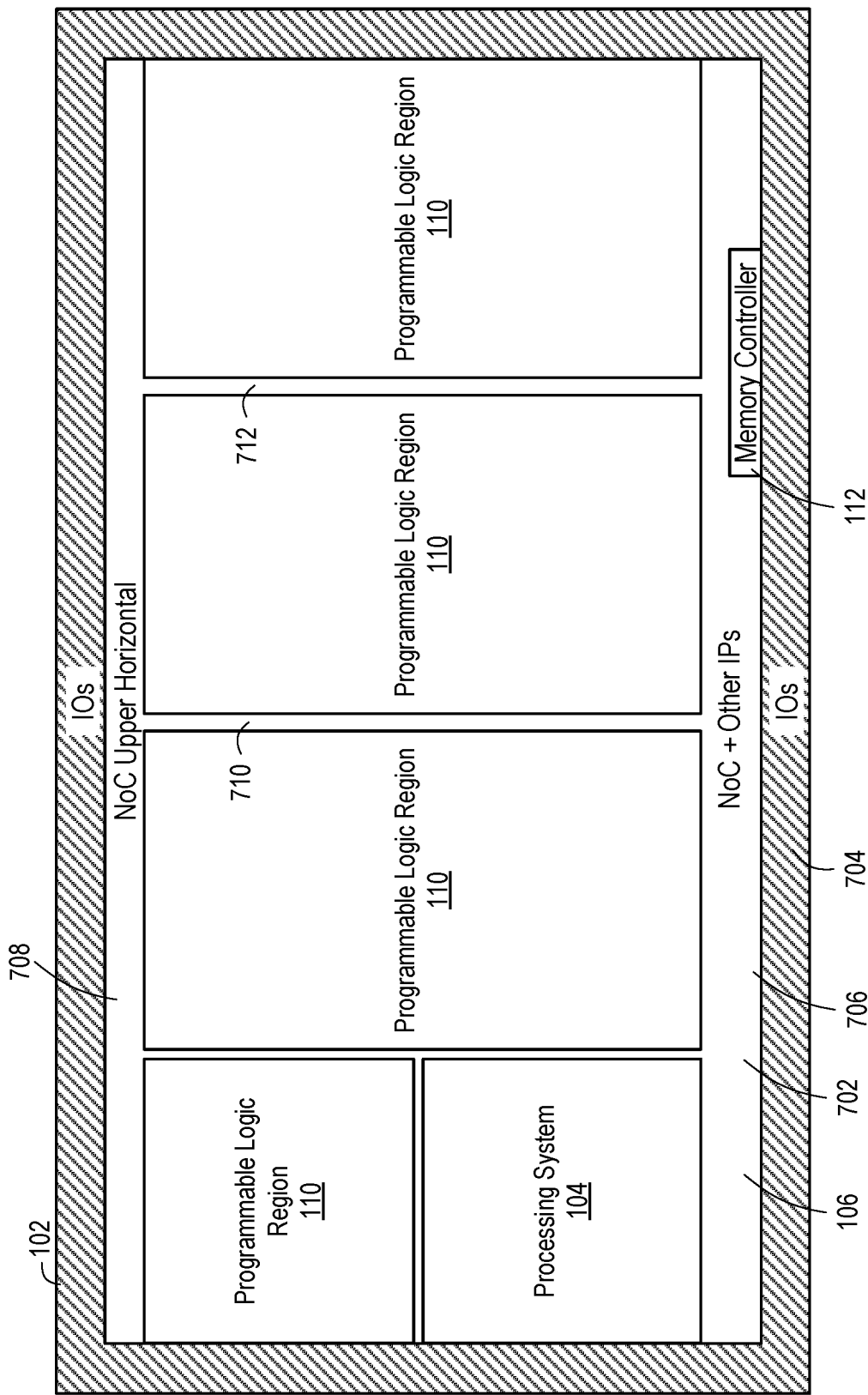
FIG. 7 is an example simplified floorplan of the programmable SoC according to some examples.

FIG. 7 is an example simplified floorplan of the programmable SoC 102 according to some examples. The floorplan includes respective regions for the processing system 104, programmable logic regions 110, NoC 106 and other IP 702, memory controller 112, and inputs/outputs (IOs) 704. The IOs 704 circumscribe other regions of the SoC 102 along the exterior of the SoC 102. The region for the NoC 106 extends horizontally across the SoC 102 with a bottom horizontal portion 706 and an (optional) upper horizontal portion 708, and vertically across the SoC 102 with a first vertical portion 710 and a second vertical portion 712.

Figure 8:
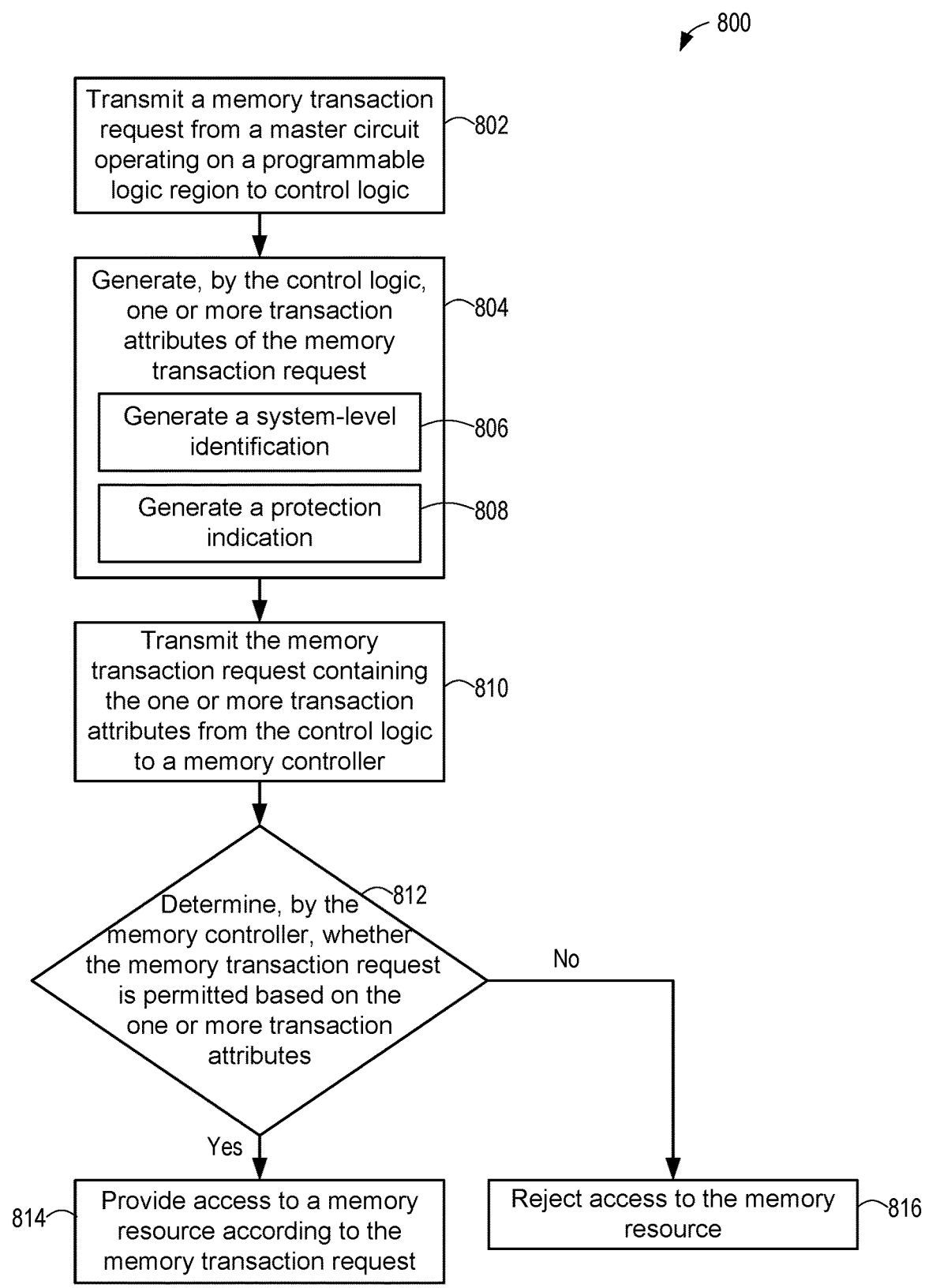
FIG. 8 is a flow chart of a method for operating an integrated circuit (IC) with memory access protection according to some examples.

FIG. 8 is a flow chart of a method 800 for operating an IC with memory access protection according to some examples. In operation 802, a memory transaction request is transmitted from a master circuit operating on a programmable logic region to control logic. For example, any of master circuits 506-520 operating on programmable logic region 110 can generate and transmit a memory transaction request to control logic 522, 524. The memory transaction request can include attributes as described above. In operation 804, one or more transaction attributes of the memory transaction request is generated by the control logic. For example, a system-level identification of the master circuit can be generated by the control logic as in operation 806, and a protection indication of the memory transaction request can be generated by the control logic as in operation 808. The one or more transaction attributes can be generated by control logic 522, 524 as described above. In operation 810, the memory transaction request containing the one or more transaction attributes is transmitted from the control logic to a memory controller. For example, the memory transaction request is transmitted from control logic 522, 524 to memory controller 112 as described above.

In operation 812, whether the memory transaction request is permitted is determined, by the memory controller, based on the one or more transaction attributes. For example; as described above, a MPU 526 of the memory controller 112 can compare the one or more transaction attributes of the memory transaction request to one or more aperture attributes of one or more memory apertures. In such example, the memory transaction request can be permitted when the one or more transaction attributes of the memory transaction request matches the one or more aperture attributes of any of the one or more memory apertures. If the memory transaction request is determined to be permitted, in operation 814, access to a memory resource, via the memory controller, is provided according to the memory transaction request. For example, memory 114 may be accessed according to the memory transaction request via the memory controller 112. If the memory transaction request is determined to not be permitted, in operation 816, access to the memory resource is rejected. For example, the memory controller 112 or MPU 526 can return an error message or a response message containing null data to the master circuit.

While the foregoing is directed to specific examples, other and further examples may be devised without departing from the basic scope thereof, and the scope thereof is determined by the claims that follow.

What is claimed is:

1. An integrated circuit comprising:
a programmable logic region comprising a master circuit associated with an application;
control logic communicatively coupled to the programmable logic region, the control logic being configurable to generate one or more transaction attributes of a memory transaction request based on the master circuit and an application-level identifier of the application, the memory transaction request being communicated from the first master circuit, wherein the control logic is disposed within a network-on-chip;
an interconnect communicatively coupled to the control logic, the interconnect being operable to communicate the memory transaction request therethrough; and
a memory controller communicatively coupled to the interconnect, the memory controller being operable to receive the memory transaction request, the memory controller being configurable to determine whether the memory transaction request is permitted based on a comparison of the one or more transaction attributes and one or more memory apertures.

2. The integrated circuit of claim 1, wherein the control logic includes hardened logic configurable by setting one or more values of one or more registers.

3. The integrated circuit of claim 1, wherein the control logic is configurable to generate an identification corresponding to the first master circuit, the one or more transaction attributes comprising the identification.

4. The integrated circuit of claim 3, wherein:
the identification is a system-level identification; and
the control logic is configurable to generate the system-level identification by appending bits to the application-level identification or masking bits of the application-level identification, the application-level identification being contained in the memory transaction request transmitted from the master circuit.

5. The integrated circuit of claim 1, wherein the control logic is configurable to selectively pass or drive to a target level a protection indication of the memory transaction request, the one or more transaction attributes comprising the protection indication.

6. The integrated circuit of claim 1, wherein:
the memory controller comprises a memory protection unit;
the memory protection unit is configurable to define the one or more memory apertures having corresponding one or more aperture attributes;
the memory protection unit is further configured to determine whether the one or more aperture attributes of any of the one or more memory apertures matches the one or more transaction attributes of the memory transaction request received by the memory controller; and
the memory protection unit is configured to permit access to memory communicatively coupled to the memory controller when the one or more aperture attributes of any of the one or more memory apertures matches the one or more transaction attributes of the memory transaction request received by the memory controller.

7. The integrated circuit of claim 6, wherein the memory protection unit is configured to return an error message or a response message containing null data when the one or more aperture attributes of each of the one or more memory apertures do not match the one or more transaction attributes of the memory transaction request received by the memory controller.

8. The integrated circuit of claim 6 further comprising a platform management controller communicatively coupled to the control logic and the memory protection unit, the platform management controller being configured to configure the control logic and the memory protection unit.

9. A method for operating an integrated circuit, the method comprising:
transmitting a memory transaction request from a master circuit operating on a programmable logic region to control logic;
generating, by the control logic, one or more transaction attributes of the memory transaction request based on the master circuit and an application-level identifier of an application associated with the master circuit, wherein the control logic is disposed within a network-on-chip;
transmitting the memory transaction request containing the one or more transaction attributes from the control logic to a memory controller;
determining, by the memory controller, whether the memory transaction request is permitted based on a comparison of the one or more transaction attributes and one or more memory apertures; and
providing access to a memory resource, via the memory controller, according to the memory transaction request when the memory transaction request is permitted.

10. The method of claim 9, wherein the control logic is configurable hardened logic.

11. The method of claim 9, wherein generating the one or more transaction attributes of the memory transaction request includes generating a system-level identification comprising appending bits to the application-level identification or masking bits of the application-level identification, the application-level identification corresponding to and generated by the master circuit, the one or more transaction attributes comprising the system-level identification.

12. The method of claim 9, wherein generating the one or more transaction attributes of the memory transaction request includes selectively passing or driving to a target level a protection indication of the memory transaction request, the one or more transaction attributes comprising the protection indication.

13. The method of claim 9, wherein determining, by the memory controller, whether the memory transaction request is permitted comprises:
comparing, by a memory protection unit of the memory controller, the one or more transaction attributes of the memory transaction request to one or more aperture attributes of the one or more memory apertures, the memory transaction request being permitted when the one or more transaction attributes of the memory transaction request matches the one or more aperture attributes of any of the one or more memory apertures.

14. The method of claim 13 further comprising configuring the control logic and the memory protection unit by a platform management controller, wherein the one or more transaction attributes are configured by the platform management controller, and the one or more aperture attributes of the one or more memory apertures are configured by the platform management controller.

15. The method of claim 9 further comprising rejecting access to the memory resource when the memory transaction request is not permitted.

16. An integrated circuit comprising:
a programmable logic region;
a network-on-chip (NoC) comprising a NoC master unit (NMU) and a NoC slave unit (NSU), the NMU being an interface to the NoC for the programmable logic region, the NMU comprising control logic configurable to provide one or more transaction attributes of a memory transaction request from the programmable logic region; and
a memory controller communicatively coupled to the programmable logic region via the NoC, the memory controller comprising a memory protection unit (MPU), the NSU being an interface to the NoC for the memory controller, the MPU being configurable to permit access to a memory resource according to the memory transaction request when the one or more transaction attributes match one or more aperture attributes of at least one of one or more memory apertures.

17. The integrated circuit of claim 16, wherein the control logic is configurable to generate an identification corresponding to a master circuit in the programmable logic region from which the memory transaction request is transmitted, the one or more transaction attributes comprising the identification.

18. The integrated circuit of claim 16, wherein the control logic is configurable to selectively pass or drive to a target level a protection indication of the memory transaction request, the one or more transaction attributes comprising the protection indication.

19. The integrated circuit of claim 16, wherein the MPU is configured to return an error message or a response message containing null data when the one or more transaction attributes do not match the one or more aperture attributes of each of the one or more memory apertures.

20. The integrated circuit of claim 16 further comprising a platform management controller communicatively coupled to the NMU and the MPU, the platform management controller being configured to configure the control logic and the MPU.

* * * * *